Patented Jan. 30, 1934

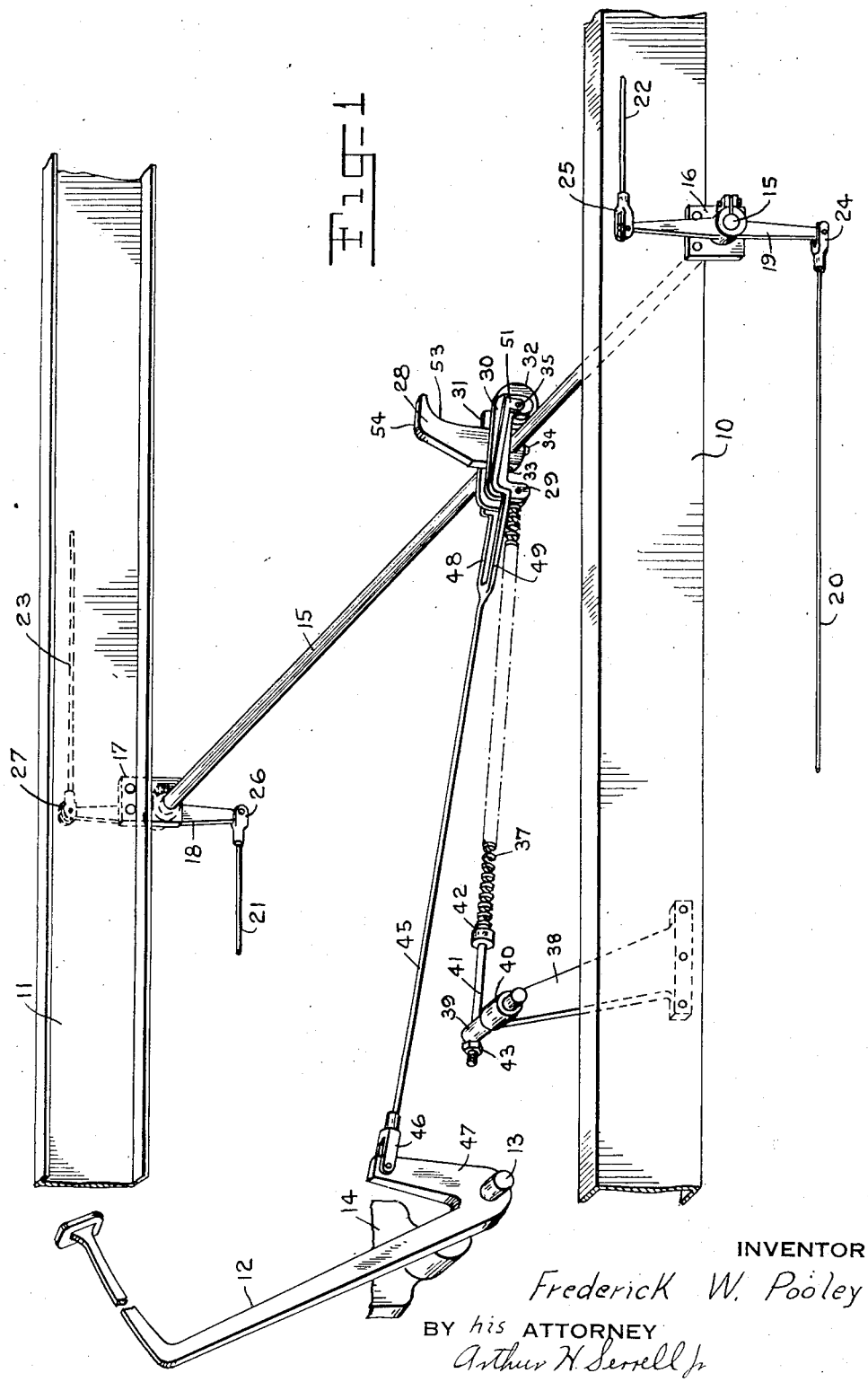

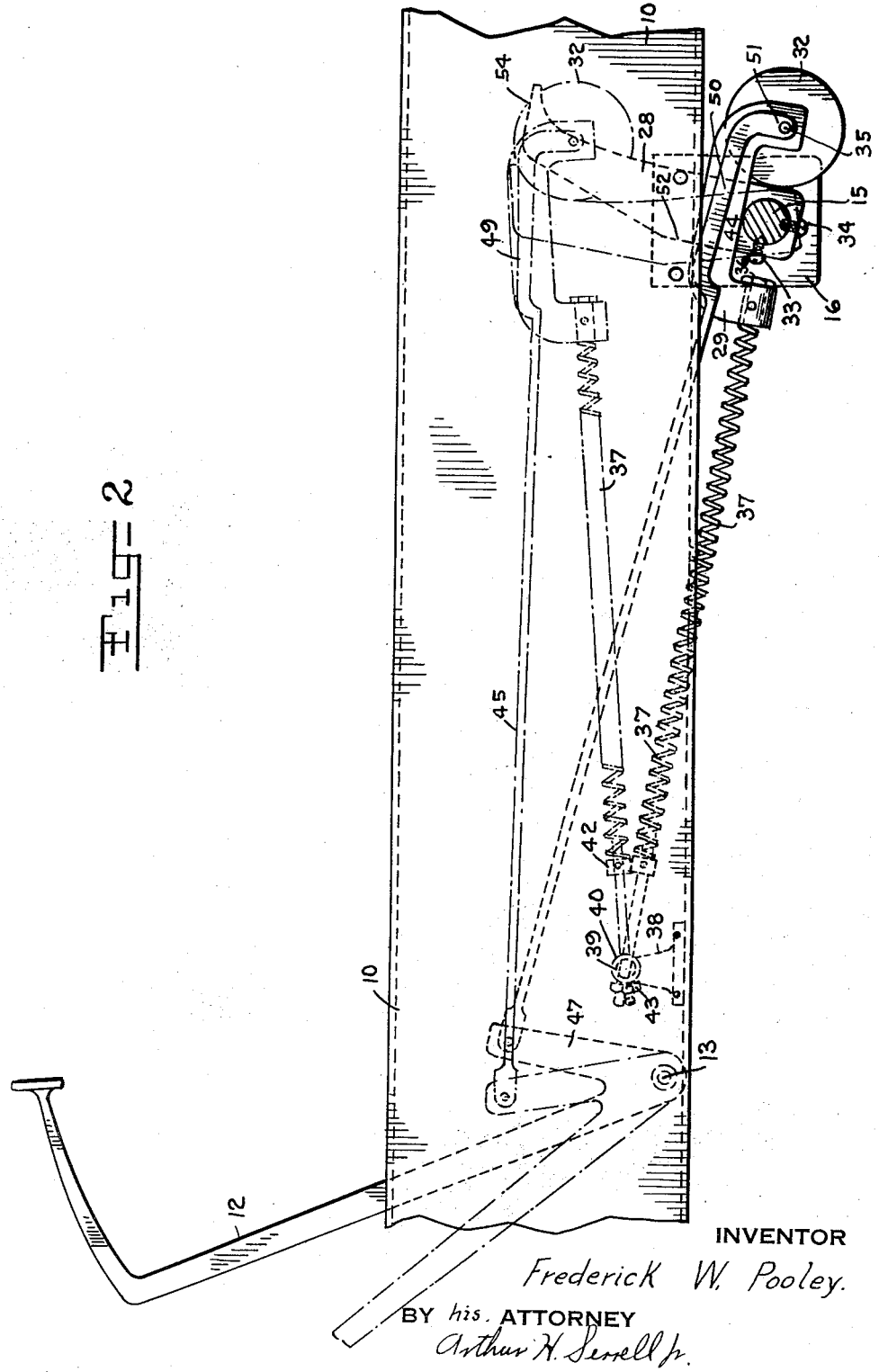

1,945,070

UNITED STATES PATENT OFFICE 1,945,070

BRAKE CONTROL MECHANISM

Frederick W. Pooley, Philadelphia, Pa.

Application December 12, 1930
Serial No. 501,759

8 Claims. (Cl. 188—167)

This invention relates in general to a controlling mechanism for a mechanical braking system and more particularly to a device for regulating the operation of the usual braking mechanism utilized in connection with automobiles and the like.

The primary object of my invention is to provide a brake control mechanism operative by a substantially reduced application of manual effort to effect the complete or partial control of the mechanical brake system for the purpose of stopping or reducing the movement of the vehicle with which the device is associated.

Another object of the invention is to construct a device which may be readily associated with the mechanical type of braking system as now used in automobile constructions and which assists in controlling the application of the brake in such a manner as to relieve the operator of a direct application of effort.

The invention further contemplates the provision of an automatically operative brake control mechanism which will assume a normal inoperative position upon the release of the actuating means by the operator.

Another object is to provide a means whereby additional torque or braking effort may be applied to the brake system when the actuating lever is operated its maximum limit without materially increasing the force exerted by the operator to accomplish the same.

A further object is the provision of a device of this character which may be adjustably set to produce any desired amount of effort when manually actuated to supply sufficient torque upon the braking mechanism to operate the same.

It further contemplates the provision of means whereby a constant and normally inoperative force is controlled by the operator to effect an increasing torque upon the braking mechanism without increasing the force exerted by the operator.

My invention also includes other objects, advantages and novel features of construction and arrangement hereinafter more particularly referred to and which will be apparent from the accompanying drawings in which I have illustrated the preferred form of the invention.

In the drawings:

Figure 1 is a perspective view illustrating the preferred form of the control mechanism in association with an automobile chassis, and Fig. 2 is a side elevation of the embodiment of the invention as illustrated in Figure 1 showing the operation of the device.

Referring to the drawings, the form of the vehicle chassis with which the device is preferably associated includes the usual parallel channel members 10 and 11. As is customarily employed, a foot brake lever as indicated at 12 forms an actuating means for manually exerting sufficient effort to control the braking mechanism of the vehicle. No departure from the usual structure normally employed is utilized in pivotally mounting the lever 12 on a clutch shaft 13 which extends within a clutch casing 14. A cross shaft 15 is normally included in this part of the vehicle structure and is either journalled in the channel members forming the framework of the vehicle or between brackets suitably secured to the channel members.

As herein illustrated I prefer to employ plates 16 and 17 suitably connected to the lower portion of the channel members 10 and 11 by means of rivets or otherwise, the said plates having openings therein through which the shaft 15 may extend. In this construction the shaft 15 is journalled and supported by the plates 16 and 17 below the channel members forming the framework of the vehicle. Firmly connected in any desired manner to the ends of the shaft 15 are levers 18 and 19.

The device as illustrated is adapted for use with four wheel brakes. The brake rods, extending to the braking mechanism associated with the front wheels of the vehicle, are indicated at 20 and 21. The rods for the braking mechanism in the rear end of the vehicle are indicated at 22 and 23. The brake rods and levers are connected by customary clevis joints as indicated at 24, 25, 26 and 27.

The turning effort or torque exerted on the shaft 15 is transmitted by the levers 18, 19 and brake rods 24, 25, 26 and 27 to the respective braking mechanisms. Located in a fixed position on the shaft 15 and in alignment with the actuating lever 12, is a control member 28 herein illustrated in the form of a lever, or arm, against which a force may be exerted through varying increments of leverage distances to effect a braking effort as will be hereinafter more particularly described.

A U shaped bifurcated member, indicated at 29, preferably includes arms 30 and 31 positioned adjacent the sides of the lever 28. A movable member, herein illustrated as a roller 32, is constructed of a width corresponding to that of the member 28 and is adapted to assume various positions against the surface of the lever. Set screws 33 and 34, or other equivalent means, may be utilized to firmly connect the shaft 15 and lever 28.

As herein illustrated a pin 35 extending centrally from the roller 32 is adapted to be journalled in the end portion of the U member comprising the arms 30 and 31, the said roller being maintained in position between the respective arms and against the rolling surface of the lever 28 as will hereinafter be more particularly described.

An energized means is suitably connected to the opposite end of the U member as indicated at 36, said means preferably comprising a spring 37 having sufficient tension therein to operatively maintain the roller 32 against the surface of the control member 28 and provide sufficient energy for the normal braking effort needed to stop the vehicle.

A bracket 38 is connected to the frame of the vehicle in any desired manner and is adapted to journal a connecting pin 39 in the upper portion of the same as indicated at 40. A rod 41 extends through an opening in the pin 39 and is suitably connected to the end of the spring 37 as indicated at 42.

This construction pivotally supports the energized means and maintains the same in the plane of alignment of the actuating lever 12 and member 28. A nut 43 on the rod 41 may be adjusted so that any desired amount of tension is placed in the spring 37, it being obvious that the greater the braking effort needed to stop a given vehicle, the more tension can be placed in the spring 37 to facilitate this result when the same is in operation. It is desired to point out that other and equivalent means for pivotally and adjustably maintaining the energized means could be utilized without departing from the nature and spirit of the invention.

The energized means 37 in its inoperative position by this construction is rendered ineffective regardless of the tension in the spring. Inasmuch as the centers of the pin 39, shaft 15 and pin 35 are in alignment, the pull of the energized means 37 is therefore exerted through the center of the shaft 15, and until this spring is moved out of this position, it will not exert any turning effort on the shaft 15. In the inoperative position the under surfaces of the arms 31 and 30 are adapted to rest by action of gravity on the shaft 15 as indicated at 44 to provide the necessary shaft alignment.

The brake actuating lever 12 is connected by means of a rod 45 to effect an operation of the control mechanism, one end of said rod being suitably connected by a clevis joint 46 to an extending arm 47 of the lever 12. The opposite end is bifurcated and comprises arms 48 and 49 extending on opposite sides of the member 29. The end portions of the arms 48 and 49 are preferably constructed in a U form as indicated at 50 to permit a clearance between the under surfaces of the arms and the shaft 15 when the device is in its inoperative position.

The ends of the respective arms 48 and 49 include openings therein for pivotally engaging the extending portions of the pin 35 as indicated at 51. The initial line of pull of the actuating lever is preferably located slightly above the center of the shaft 15 so that the operator may readily start the device. In the operation of the mechanism manual effort is exerted on the foot brake pedal 12, the movement of which is transmitted through the rod 45 to move the roller 32 along the surface of the control member 28. As soon as the roller is moved from its inoperative position the energized means 37, which is fixed in position in alignment with the roller 32 through the member 29, simultaneously moves to a corresponding position, this being facilitated by the pivotal arrangement at 39, to exert a tension effort stored in the spring upon the shaft 15 at a lever arm on the member 28 corresponding to the degree of movement through which the operator has actuated the lever 12. The angular movement of the arm 47 of the foot lever 12 and the control lever 28 is substantially equal so that the shaft 15 is moved proportionately corresponding to the actual movement made by the operator on the foot lever regardless of the effort stored in the spring 37. In this manner the operator merely exerts sufficient effort to actuate the roller along the surface of the control lever 28 and simultaneously brings into operation a force which is utilized through varying increments of leverage distance on the member 28 to control the torque exerted on the shaft 15 and thereby govern the effort applied through the rods 20, 21, 22 and 23 to the braking mechanism.

The lower rolling surface of the control member 28 is straight as indicated at 52 so that the angular movement substantially corresponds to that of the arm 47 of the actuating lever. The upper portion of the rolling surface is curved as indicated at 53 so that the member 28 will be moved through a relatively larger angle than the actuating lever. This facilitates a greater torque or turning effort on the shaft 15 without substantially increasing the effort applied by the operator.

A guard 54 located on the member 28 defines an upper limit of movement to which the roller may be actuated. One view of the control mechanism, as illustrated in Figure 2, shows the device actuated through its maximum travel. In this position the tension in the spring 37 is exerted through its maximum leverage distance to obtain a maximum of braking effort. This effort can be obtained without materially increasing the energy applied by the operator. However, the operator in raising the roller over the curved surface 53 of the member 28 is required to exert a slight additional effort which is enlarged by the greater distance of angular travel of the member 28 to assist the force supplied by the energized means. The operator, therefore, does not lose the feel of the brake resistance when moving the brake lever 12 through its maximum travel. As soon as the force exerted by the operator through the rod 45 is released the roller 32 and member 29 automatically return to their initial and inoperative positions by means of gravity thereby relieving the turning effort applied to the shaft 15. It is now obvious that any desired braking effort may be obtained by the operator by suitably limiting the movement of the foot lever 12 to correspondingly control the position which the roller 32 assumes upon the actuating lever 28 and simultaneously determines the lever arm through which the energized means is operable. The spring 37 and lever member 28 are preferably at right angles to one another in all positions to exact a maximum efficiency in transmitting the effort to the shaft 15.

The mechanism as herein disclosed is operative to effect either a complete or partial control of the brake system and obviates the direct application of the entire braking effort by the operator.

The inventive concepts herein disclosed may be embodied in other desired forms. Therefore, various modifications of the present improvements may occur to those skilled in the art and may be made without departing from the scope and purview of the invention.

I claim as my invention:

1. In a brake control mechanism, a control lever mounted on a shaft for transmitting energy to a brake mechanism, a roller operatively positioned for movement along the surface of the lever, energized means associated with said roller, means for pivotally mounting said energized means whereby the force therefrom is exerted through the center of the shaft on which the lever is mounted when the roller is in an inoperative position, said energized means pivoting to an operative position upon the movement of the roller along the lever.

2. In a brake control mechanism, a control lever mounted on a shaft for transmitting energy to a brake mechanism, a roller associated with said lever, means for mounting the roller to be operable along the surface of the lever, energized means associated with said roller, means for pivotally mounting said energized means whereby the force therefrom is exerted through the center of the shaft on which the lever is mounted when the roller is in an inoperative position, means for actuating said roller and simultaneously controlling said energizing means whereby the force therefrom is exerted against the lever throughout its entire travel at a desired perpendicular distance from the center of the shaft to operate the brake mechanism.

3. In a brake control mechanism, a control lever mounted on a shaft, means for transmitting the movement of the shaft to a plurality of brake actuating rods, a roller operatively positioned for movement along the surface of the lever, means for controlling the position of the lever against the roller, energized means associated with said roller and controlling means whereby the force therefrom is continuously exerted at an increasing leverage distance from the shaft to effect a braking effort.

4. In a brake control mechanism comprising an arm member fixed on a shaft journalled in the frame of a vehicle, means for transmitting the movement thereof to a plurality of brake actuating rods, a roller operatively positioned for movement along the surface of the arm, energized means associated with said roller, means for pivotally mounting said energized means whereby the same remains perpendicularly disposed to the arm throughout the travel of the roller thereon.

5. In a brake control mechanism comprising an arm member fixed on a shaft journalled in the frame of a vehicle, means for transmitting the movement thereof to a plurality of brake actuating rods, a roller operatively positioned for movement along the surface of the arm, energized means associated with said roller, means for pivotally mounting said energized means whereby the force therefrom is exerted by the roller perpendicularly against the surface of the arm, said energizing means pivoting to assume a perpendicular position to the arm throughout its travel.

6. In a brake control mechanism, a control lever mounted on a shaft journalled in the frame of a vehicle, a movable member operatively positioned along the surface of said lever, means for actuating said movable member, a guard located on said lever for determining the upper limit of travel of the movable member thereon, a pivotal U shaped member associated with said movable member and adapted to rest by action of gravity on the shaft to determine the lower limit of travel and the inoperative position of the movable member.

7. In a brake control mechanism, a control arm mounted on a shaft for transmitting energy to a brake mechanism, a movable member operatively positioned against the surface of said arm, the upper portion of said arm being curved outwardly, actuating means for said movable member whereby the same is moved to a position against the curved surface of the arm to thereby facilitate an increase in the turning movement of the shaft.

8. In a brake control mechanism, a control lever mounted on a shaft, means for transmitting the movement of the shaft to a plurality of brake actuating rods, a roller operatively positioned for movement along the surface of the lever, the upper surface of said lever being curved outwardly, manually responsive means for controlling the position of the roller against the lever, energized means associated with said roller and responsive means whereby the force therefrom is exerted at a controlled leverage distance from the shaft and combined with the manual effort exerted by the operator in actuating the roller over the upper surface of said lever to transmit a braking effort.

FREDERICK W. POOLEY.